United States Patent
Effinger et al.

[11] 4,021,805
[45] May 3, 1977

[54] SIDELOBE BLANKING SYSTEM

[75] Inventors: David D. Effinger, LaHabra; Norol T. Evans, San Pedro, both of Calif.

[73] Assignee: Hughes Aircraft Company, Culver City, Calif.

[22] Filed: Dec. 20, 1971

[21] Appl. No.: 210,256

[52] U.S. Cl. .................. 343/17.2 PC; 343/100 LE
[51] Int. Cl.$^2$ ..................... G01S 7/28; G01S 9/233
[58] Field of Search .............. 343/17.2 PC, 17.2 R, 343/100 LE, 16 LS

[56] References Cited
UNITED STATES PATENTS

| | | | |
|---|---|---|---|
| 3,094,695 | 6/1963 | Jahn | 343/100 LE |
| 3,349,402 | 10/1967 | Foster | 343/100 LE |
| 3,380,054 | 4/1968 | Cook et al. | 343/17.2 PC |

*Primary Examiner*—Malcolm F. Hubler
*Attorney, Agent, or Firm*—W. H. MacAllister; Walter J. Adam

[57] ABSTRACT

A logarithmetic sidelobe blanking system operable in a pulse compression radar system in which the dynamic range of the blanking system is not limited by the compression dynamic range. A sidelobe blanking receiver is provided to process the sidelobe signals in a manner identical to the processing in the radar receiver. The uncompressed IF pulses in both the sidelobe receiver and the main lobe receiver are sampled prior to their being amplitude limited, and are applied through logarithmetic amplifiers whose dynamic range capability is at least equal to the dynamic range of the preceding circuits. The output signals of the logarithmetic amplifiers are then compared and if the sidelobe signal is larger than the main lobe signal the compressed pulse at the output of the pulse compressor is located and used for blanking to ensure that only the time interval of the compressed pulse width is removed. As sampling is made prior to the threshold or amplitude limiting circuit, the full dynamic range of the receiver is processed. The sidelobe receiver system in accordance with the invention also includes an arrangement for selecting the above described sampling prior to threshold operation when the input signal is limited and for selecting operation with normal sidelobe blanking comparison of compressed sidelobe signals when the input signal is at a level lower than the limiting amplitude of the channels.

10 Claims, 9 Drawing Figures

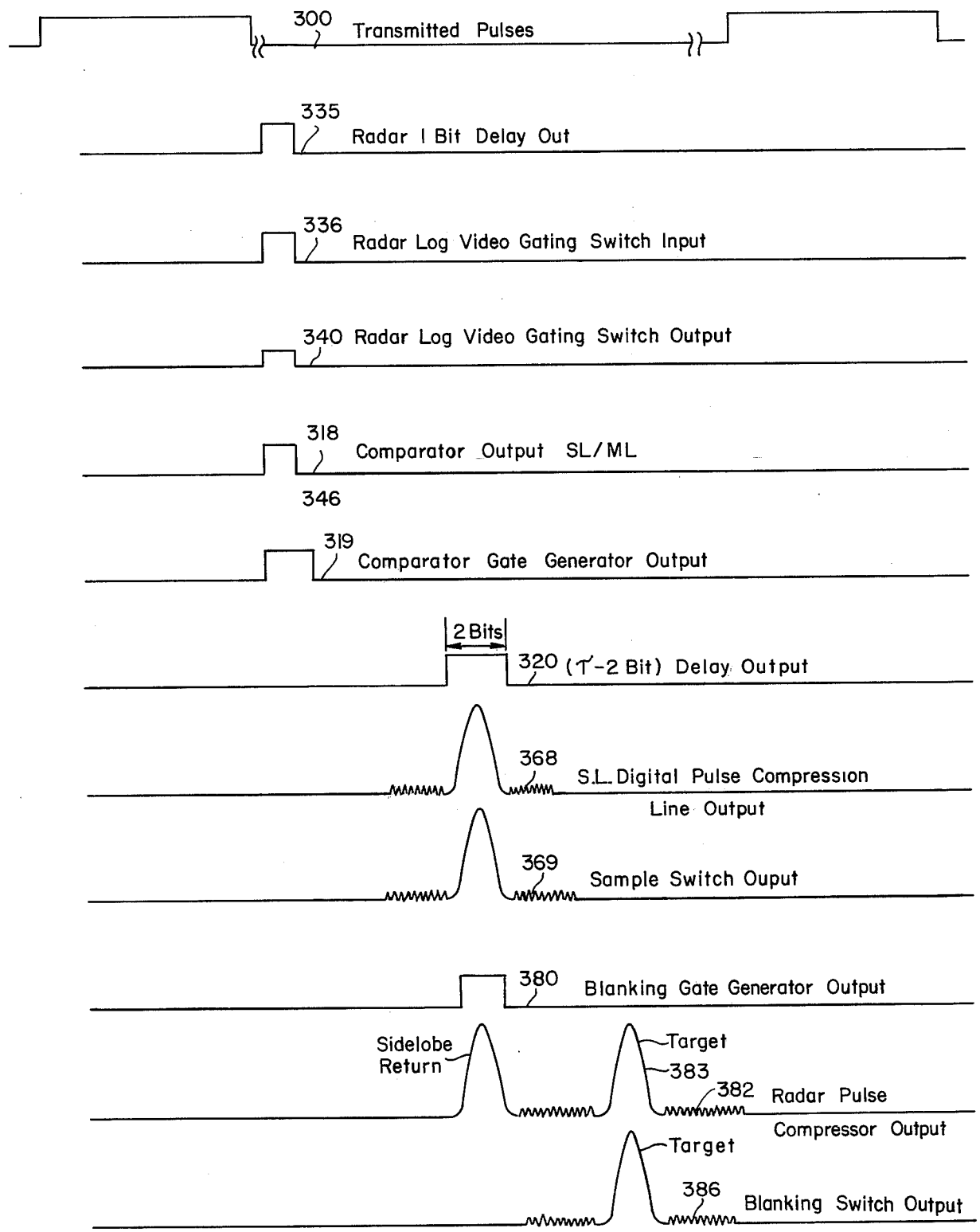

SIDELOBE BLANKING SYSTEM

BACKGROUND OF THE INVENTION

1. Field of the Invention

This invention relates to radar systems and particularly to an improved wide dynamic range sidelobe blanking arrangement for use in radar systems employing pulse compression.

2. Description of the Prior Art

In conventional sidelobe blanking receivers utilizing an auxiliary antenna arrangement, the sidelobe signals are processed in the sidelobe receiver in an identical manner to the processing of the signals in the main radar receiver. Energy for the sidelobe receiver is obtained from a separate antenna whose spatial coverage substantially matches that of the radar antenna sidelobe pattern. The detected outputs of the two receivers are then compared and if the amplitude of the video from the sidelobe receiver exceeds the amplitude of the radar receiver video, a blanking gate having the width of the sidelobe video is generated. This blanking gate is used for blanking the corresponding false target or any target appearing in the radar receiver at that time. However, if the amplitude of the radar receiver video exceeds that of the side-lobe receiver video, a blanking gate is not generated and the target is assumed to be real. In pulse compression systems, the comparison is made utilizing the compressed pulses, and false targets as well as very large valid targets may be removed when the signals have exceeded the dynamic range of the compression system. In pulse compression systems in which a constant false alarm rate is desired, amplitude limiting or hard limiting is utilized at points early in the system. This amplitude limiting limits the dynamic range of the compression systems and discrimination cannot be made between the two, as the two compressed signals are always of equal amplitude at the outputs of the compressors regardless of amplitude differences at the inputs. Thus, in this CFAR (constant false alarm rate) type of system, discrimination between main lobe and sidelobe returns can be made only up to the limit of the receiver's dynamic range or the compression gain above the system limit level. If blanking is employed over the uncompressed pulse width, far too much data is blanked out to be operable. It would be a substantial improvement in the art if a sidelobe blanking arrangement were provided that operated satisfactorily over the entire receiver dynamic range in a radar employing digital pulse compression and amplitude limiting for a desirable constant false alarm rate.

SUMMARY OF THE INVENTION

In the sidelobe blanking system in accordance with the invention, the uncompressed IF pulses in both the sidelobe receiver and the main lobe receiver channels are sampled prior to amplitude limiting and are detected in logarithmetic amplifiers whose dynamic range capability is at least equal to the dynamic range of the preceding circuits which may, for example be logarithmetic amplifiers. A comparator channel responds to the amplitude of the signals passed through the log amplifiers to provide a pulse upon the occurrence of the sidelobe signal amplitude being greater than the main lobe signal amplitude. This pulse from the comparator channel is then applied to a sampling switch at the output of the pulse compression network for the sidelobe receiver channel and if a compressed pulse is passed therethrough to a blanking gate generator a blanking pulse is applied from the blanking gate generator to a video blanking switch at the output of the pulse compression network of the radar receiver channel. This blanking pulse prevents any signals from passing to the radar processor. If the sampled main lobe signal is larger than the sampled sidelobe signal a blanking pulse is not generated and the radar signal is passed on through the video blanking switch to the radar processor. For operation in the dynamic range of the compression gain above the amplitude limit level, a detecting and switching arrangement is provided so that sidelobe blanking is performed by comparing the signals at the output of the pulse compressors.

It is therefore an object of this invention to provide a large dynamic range sidelobe blanking system.

It is a further object of this invention to provide a sidelobe blanking system operable with digital pulse compression radar systems having a relatively low detection threshold.

It is another object of this invention to provide a sidelobe blanking system that discriminates between main lobe and sidelobe signals for the full dynamic range of the radar receiver, regardless of threshold levels with a resolution of the compressed pulse width.

It is a further object of this invention to provide a sidelobe blanking system operable with first and second modes so as to include a large receiver dynamic range.

It is a further object of this invention to provide an improved sidelobe blanking system operable with a pulse compression radar system over a dynamic range including the range up to the level of the compression dynamic range as well as the range greater than the compression dynamic range.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein:

FIGS. 4 and 5 are schematic diagrams of waveforms of amplitude versus time for explaining the operation of the systems of FIGS. 2A and 2B and FIGS. 3A and 3B;

DESCRIPTION OF THE PREFERRED EMBODIMENT

Figure 1:
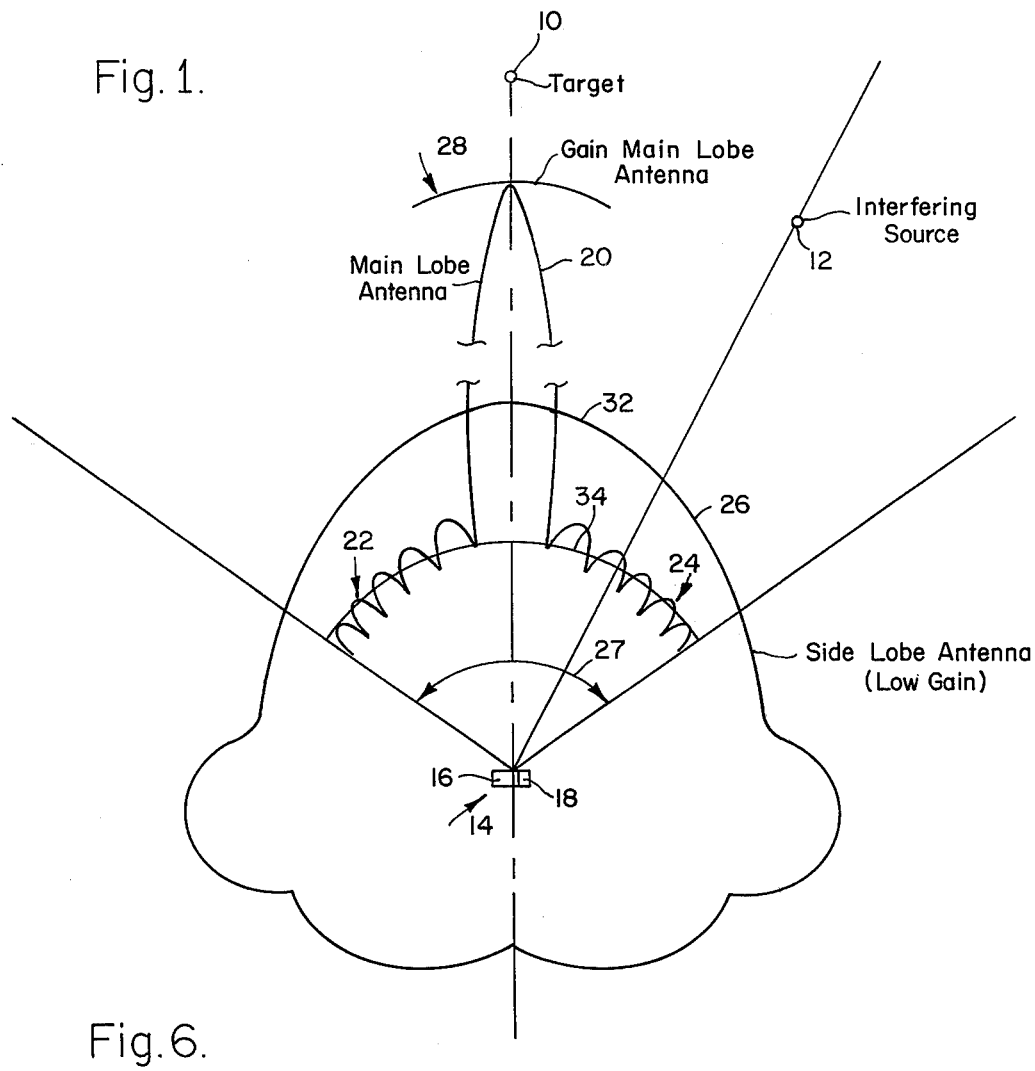
FIG. 1 is a schematic plan view showing the gain characteristics of the main lobe antenna and the sidelobe antenna for explaining the operation of the system of the invention in response to energy received from targets and from interfering sources.

Referring now to FIG. 1, the general operation of the sidelobe blanking system in accordance with the invention will be first explained relative to a target 10 and an interfering source 12. An antenna system 14 may include a main lobe or radar antenna 16 and a sidelobe or auxiliary antenna 18, normally positioned adjacent to each other or in close proximity. In some arrangements in accordance with the invention, the antennas 16 and 18 may be different aperture elements in the same array. The radar antenna 16 has a main lobe pattern 20 and a plurality of sidelobe patterns such as 22 and 24. The auxiliary antenna 18 which is the sidelobe antenna may be a low-gain antenna and have an antenna pattern such as 26 which is of a substantially constant amplitude over an azimuth receiver range of an angle 27. In some arrangements in accordance with the invention the sidelobe antenna may be an omnidirectional antenna or any suitable antenna having a constant gain over a predetermined angle. The gain of the main lobe antenna is shown by a line 28 and the gain of the sidelobe antenna 18 is shown by a line 32. The sidelobes of the radar antenna have a general amplitude indicated by a line 34 and the gain between that sidelobe amplitude and the sidelobe antenna gain of the line 32 may for example be selected to be approximately 6db. Energy returned from the target 10 which has a very large amplitude may be blanked out in a conventional system in which amplitude limiting is utilized and the amplitude dynamic range is exceeded, without the improved system of the invention. Energy from the interfering source 12 has a gain in the sidelobe antenna indicated by the line 32 and a gain in the main lobe antenna indicated by the line 34. Thus, energy received from the source 12 is interpreted as sidelobe energy to be blanked out in response to a comparison of the sidelobe signal amplitude to the radar signal amplitude in which the sidelobe signal amplitude is larger. However, in prior art systems in which the dynamic range of the receiver has been exceeded, a proper comparison cannot be performed of energy received from the source 12. The system of the invention not only insures that in systems having amplitude limiting and pulse compression, that a large target 10 passing energy into the main lobe is not blanked out but that an interfering source of energy received from a source such as the source 12 is not prevented from being blanked out. A target at the position of the source 12, for example, prior to radar lock-on would be blanked out as sidelobe energy if within the compressor gain range of the system. It is to be noted that in a coded compression radar system, only energy of the proper code is passed through the pulse compressor.

Figure 2A:
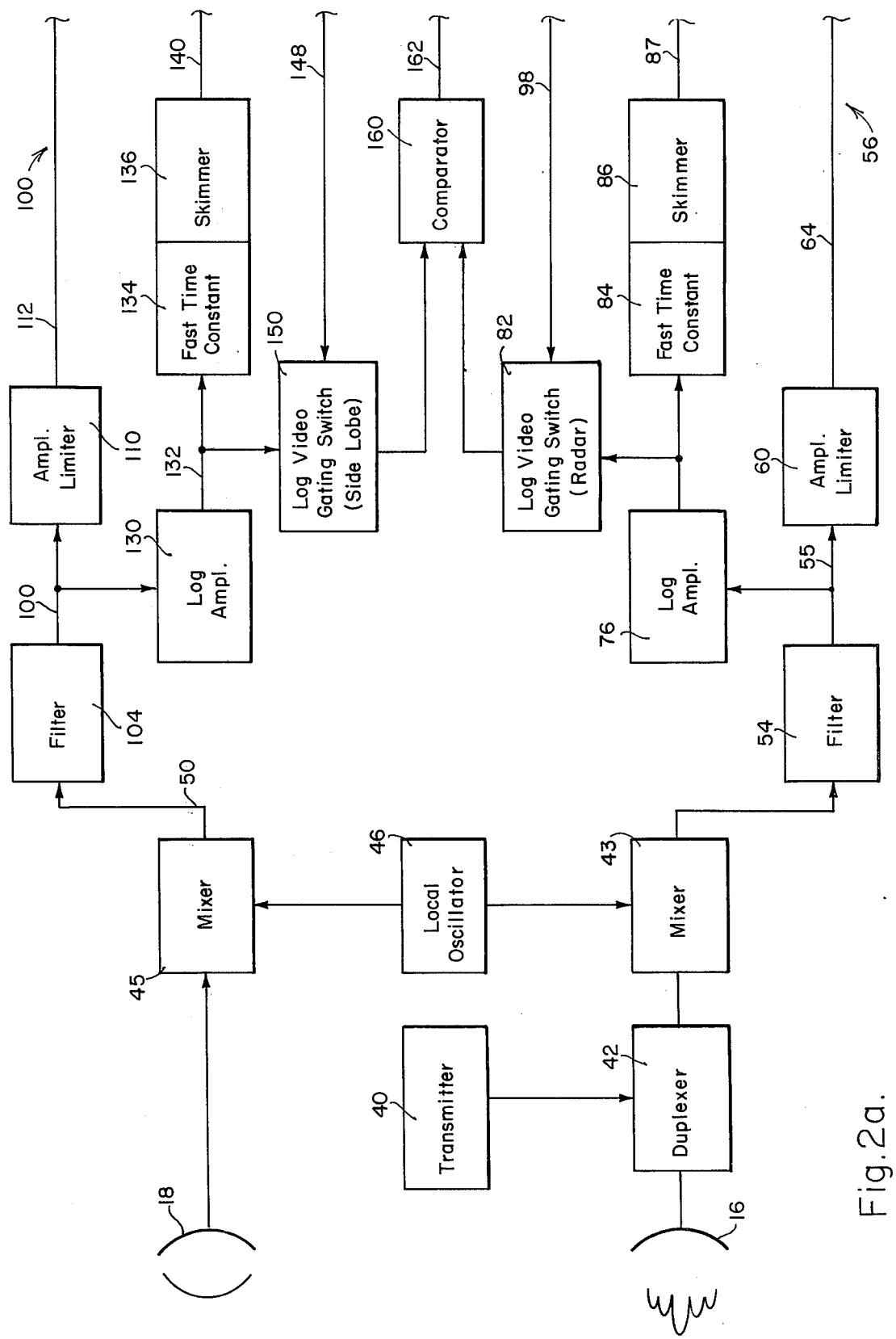
FIGS. 2A and 2B are schematic block diagrams of the sidelobe blanking system utilizing analog pulse compressors in accordance with the invention.
Figure 2B:
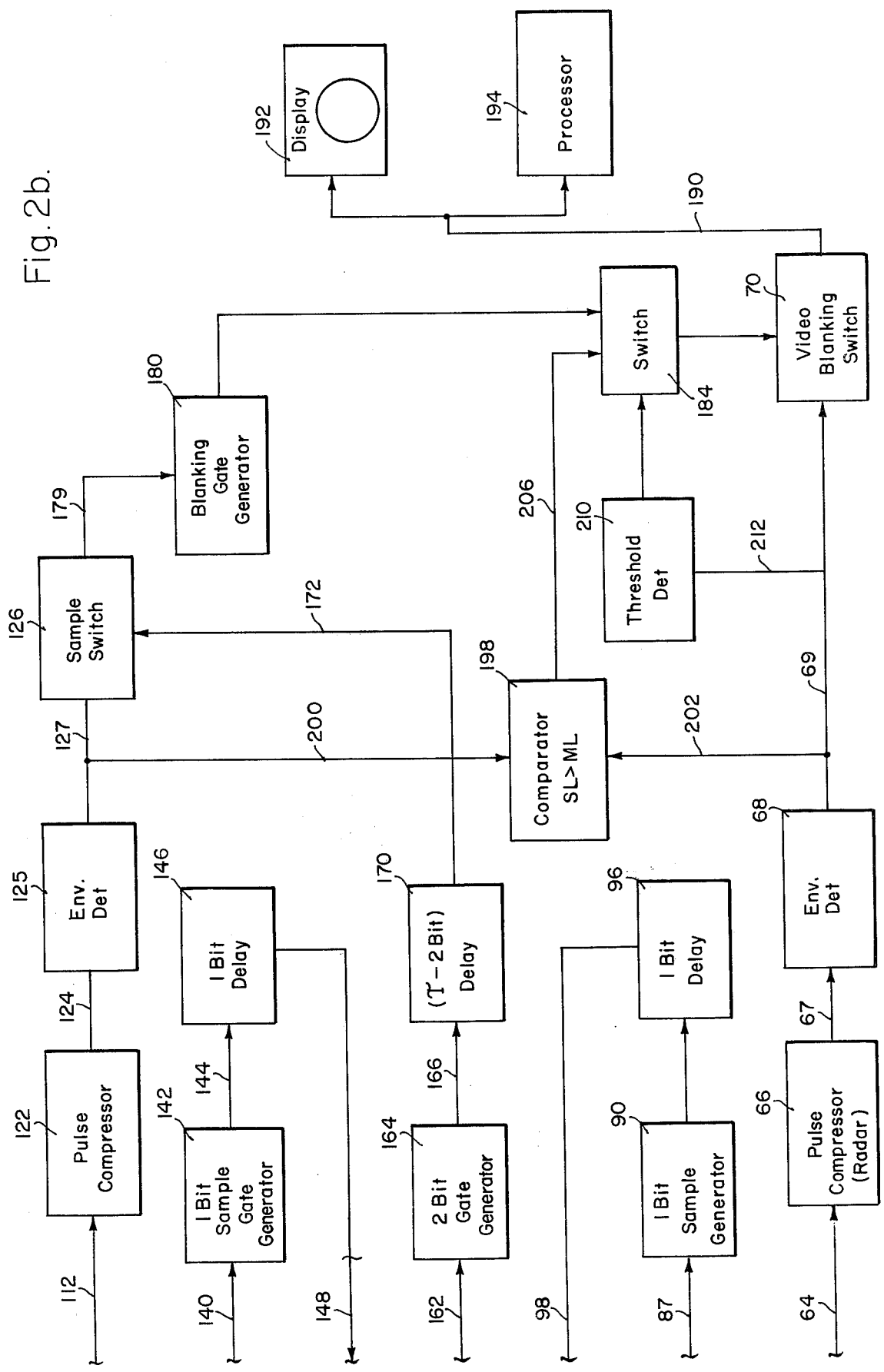

Referring now also to the block diagram of FIGS. 2A and 2B which show an analog version of the sidelobe blanking system in accordance with the invention, a transmitter 40 may be provided to transmit pulses of energy through a suitable duplexer 42 and the antenna 16 into space. The energy reflected from a target or object in space, is then intercepted by the antenna 16 and passed through the duplexer 42 to a conventional mixer 43 responsive to a local oscillator 46 for applying a radar IF (intermediate frequency) signal to a lead 48. At the same time, energy may be received from an interfering source such as 12 by the antenna 18 and applied to mixer 45 to provide a sidelobe IF signal on a lead 50. The interfering source 12 (FIG. 1) may be any operating radar system providing interference energy, a sidelobe repeater as is well-known in the art, or any pulsed interference generator responsive to the received PRF, for example.

The IF radar signal on the lead 48 is applied to a suitable filter 54 and then to a lead 55 and in turn both to a radar processing channel 56 and a pulse generating channel 58. The radar channel 56 includes an amplitude limiter 60 which may be a form of hard limiting as required to provide a constant false alarm rate system (CFAR) and that passes the limited signal to a lead 64. The limited signal is applied to a suitable pulse compressor 66 which may be a suitable analog network or any suitable pulse compressor unit as is well-known in the art. The compressed pulses are then applied from the pulse compressor 66 to a lead 67 and in turn to an envelope detector 68. A signal representing the pulse envelope is applied from the detector 68 to a lead 69 and in turn to a video blanking switch 70.

The IF radar signal at the output of the filter 54 is also applied to a logarithmetic amplifier 76 of the pulse forming channel 58 whose dynamic range capability is at least equal to the dynamic range of the preceding circuits to provide sampling prior to amplitude limiting of the limiter 60. The output signal from the logarithmetic amplifier 76 is applied to a lead 78 and divided between a log video gating switch 82 and a fast time constant circuit 84. A skimmer 86 is also provided to respond to the fast time constant circuit 84 which differentiates the uncompressed pulse to a pulse width equal to the compressed pulsed width or to a width of one bit. The circuit 84 may be any well-known differentiating circuit and the skimmer 86 may be a conventional clamping arrangement to eliminate the positive spike, for example. The negative going video signal may trigger a 1-bit sample generator 90, which may be a blocking oscillator for example, producing a gate pulse that is one bit wide on a lead 92. The 1-bit wide gate pulse is delayed in time in a bit delay circuit 96 by an amount equal to one bit, the circuit 96 being a conventional delay line, for example. The delayed pulse is applied through a lead 98 to actuate the log video gating switch 82, which for example may be a conventional video switch utilizing transistors or diodes. This operation of the pulse forming channel 58 allows a small sample to be made of the detected uncompressed pulse. This sample will be delayed in time from the leading edge of the uncompressed pulse to allow accurate amplitude sensing to be made unaffected by the leading edge slopes of the uncompressed pulse due to any filtering prior to detection, for example.

Processing of the sidelobe signal is similar to the radar channels and is performed in a sidelobe processing channel 100 and a sidelobe pulse forming channel 102. The sidelobe processing channel 100 includes a filter 104 passing a signal to a lead 106 and in turn to an amplitude limiter 110. The signal from amplitude limiter 110 is applied through a lead 112 to a pulse compressor 122 which responds to the signal to apply the compressed pulse to a lead 124 and in turn through an envelope detector 125 and a lead 127 to a sample switch 126. The pulse forming channel 102 includes a logarithmetic amplifier 130 applying a signal to a lead 132 and in turn to a fast time constant circuit 134 and a skimmer 136. The signal provided by the skimmer 136 is applied through a lead 140 to a 1-bit sample gate generator 142 and in turn through a lead 144 to a 1-bit delay circuit 146. A delayed pulse is applied from the delay circuit 146 through a lead 148 to a log video gating switch circuit 150. Thus, sampling of the sidelobe signal is provided at the log video gating switch 150 in a manner similar to the sampling at the switch 82.

The two video samples, one from the sidelobe receiver and one from the main lobe receiver, are compared in an amplitude comparator 160 and if the sidelobe video sampled exceeds the main lobe video sample, a trigger pulse is generated on a lead 162. If the main lobe video amplitude exceeds the sidelobe video amplitude, a gate pulse is not generated. The comparator 160 may be a conventional differential amplifier with a clamping circuit at the output to pass only positive pulses, for example. A trigger pulse on the lead 162 generates a gate pulse in a 2-bit gate generator 164 which is applied to a lead 166 and in turn is delayed in time by an uncompressed pulse width $\pi$ less two bits in a delay circuit 170. A variable delay of one-half bit may also be included in the circuit 170 so that the 2-bit pulse brackets the compressed signal. The delayed pulse provided by the delay circuit 170 is applied through a lead 172 to sample switch 126 which is at the output of the sidelobe receiver digital pulse compressor line. The sample switch 126 which may be a conventional transistor switch, opens a path for a period of two bits allowing a sample to be made of the compressed pulse on the lead 127 substantially two bits in width, and delayed in time a predetermined period from the comparison in the comparator 160. If a compressed side lobe pulse is present within the sample time it is passed through a lead 179 to trigger 1-bit gate generator 180 which applies a pulse on a lead 182 to a 2-position switch 184, and in turn through a lead 186 to the video blanking switch 70 to blank radar signals from passing therethrough. Blanking of the video in the main lobe channel from appearing in the main lobe receiver is performed by the blanking switch 70. The sidelobe signal which is received in the main radar channel at substantially the same time as in the sidelobe channel is blanked out by the switch 70. If the radar return from the target occurs at the same time it is also blanked out providing the radar return is smaller in amplitude than the sidelobe return. It has been found that this type of blanking greatly improves the radar performance. The video signal passed through the video blanking switch 70 is applied to a lead 190 and in turn to suitable utilization units such as one or both of a display unit 192 and a processor unit 194.

The above-described system operates when the signal has sufficient amplitude that it is limited by the amplitude limiters 60 and 110 and is above the dynamic range of the compressor gain. However, for operation when the signal amplitude is below this limit level and in which the amplitude may be within the noise prior to compression, so that comparisons cannot be performed, a comparator 198 is provided for operation with a conventional type sidelobe blanking concept. The comparator 198 responds to the compressed pulsed on a lead 200 from the sidelobe channel and a compressed pulse on a lead 202 derived from the radar main lobe channel. The comparator 198 which may be a conventional differential amplifier and clamping circuit responds to the sidelobe amplitude being greater than the main lobe amplitude to apply a blanking signal through a lead 206 and through the switch 184 to the video blanking switch 70 when the switch 184 is in that position in response to a threshold detector 210 coupled thereto. The threshold detector 210 is coupled from the lead 69 through a lead 212 to detect a signal at a threshold level that is below the system limiting level and in turn to apply a strobe signal to the switch 184 so as to pass signals from the lead 206 to the lead 186. When the switch is not responsive to the threshold detector 210, it is in a condition to pass signals from the lead 182 to the lead 186. Suitable timing signals may be provided to any circuits of FIG. 2 requiring synchronization such as from a timing source in the transmitter 40, as is well-known in the art. The bit timing or clock signals may have a repetition period defined by the range bin intervals as is also well-known in the art.

Figure 3A:
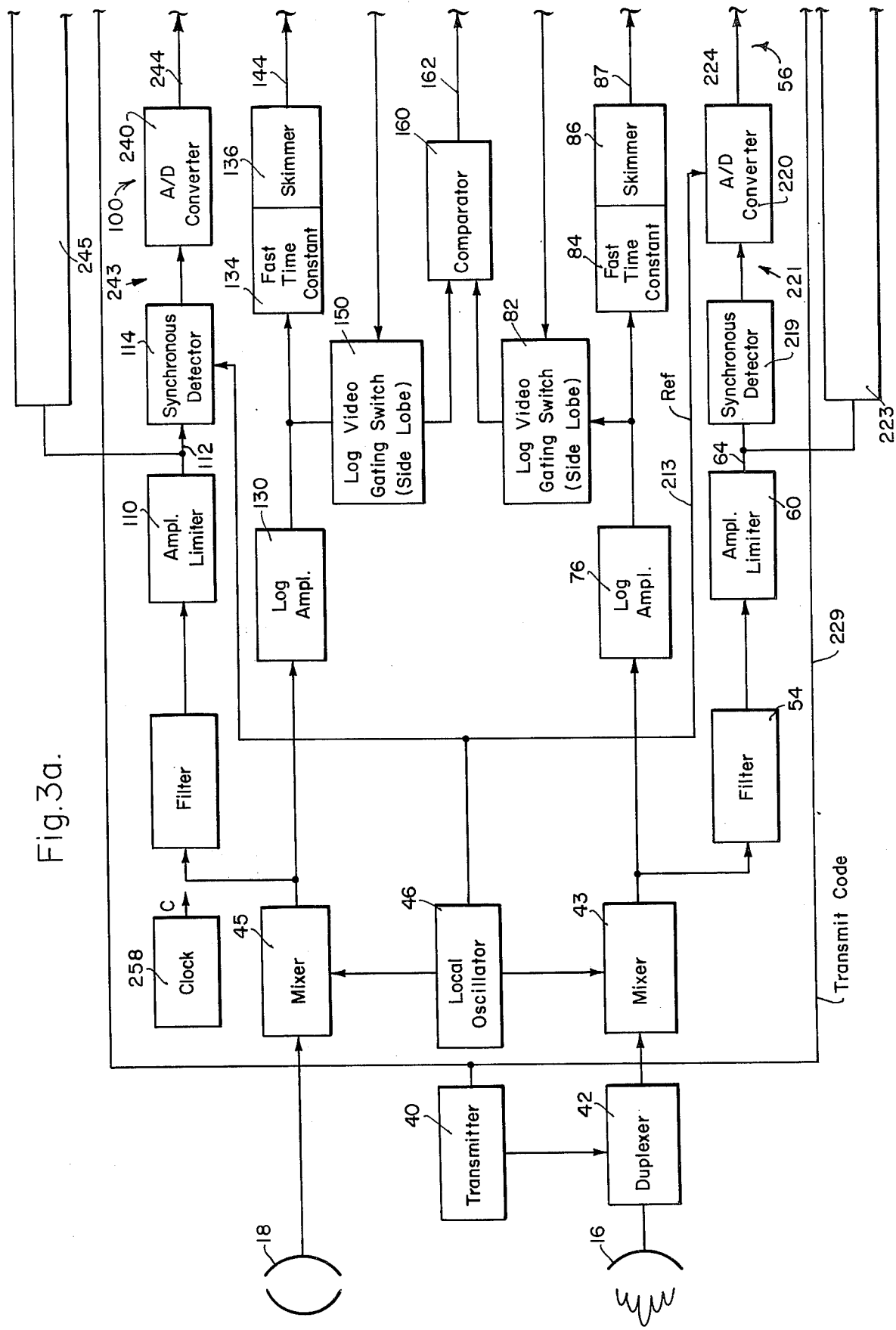
FIGS. 3A and 3B are schematic block diagrams of the sidelobe blanking system utilizing digital pulse compressors in accordance with the invention.
Figure 3B:
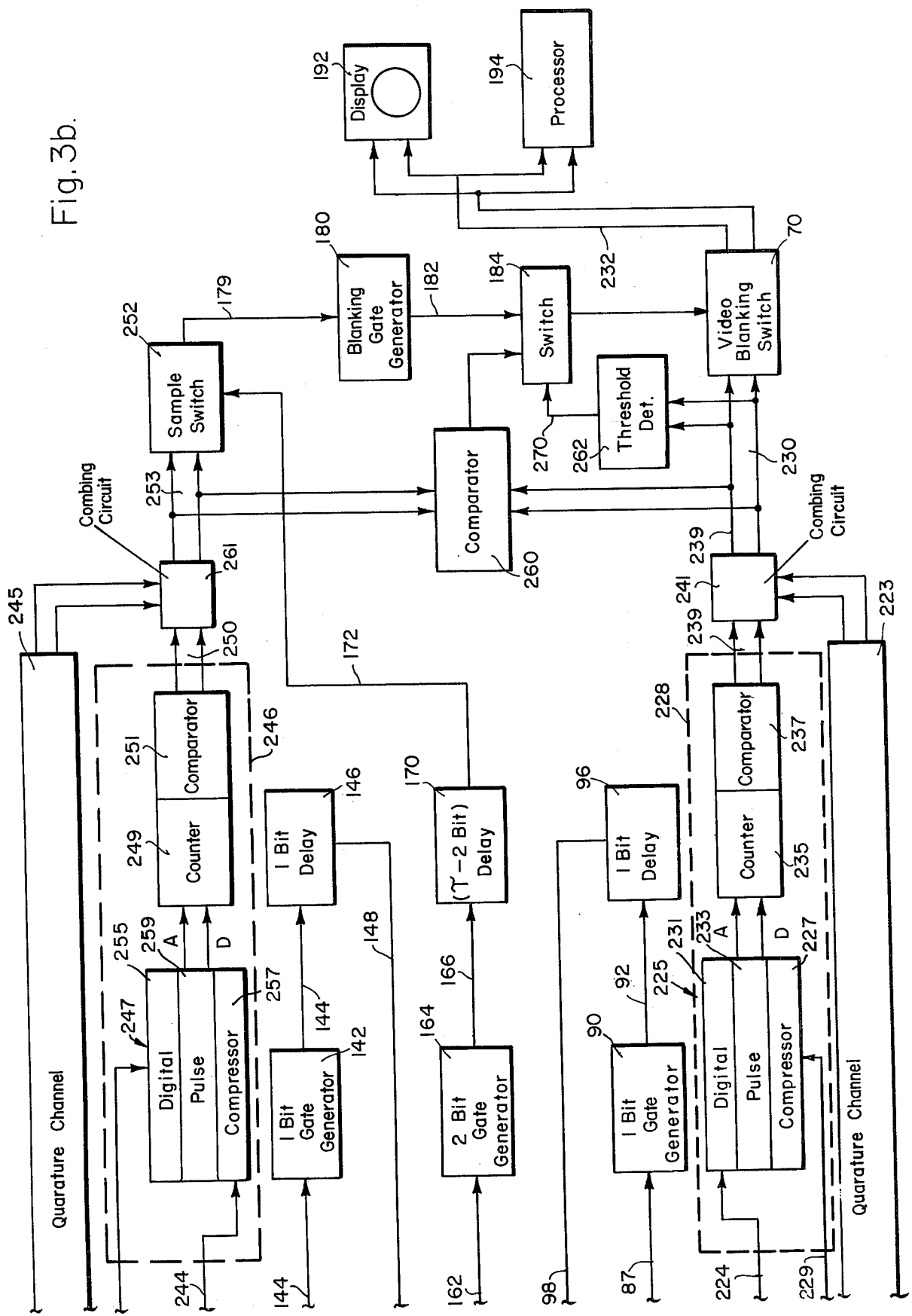
Figure 7:
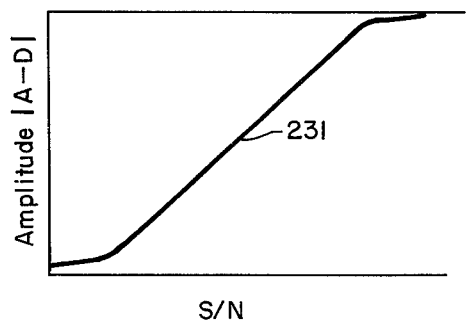
FIG. 7 is a graph of $|A-D|$ versus S/N for explaining the statistical amplitude provided by the digital compressor of FIG. 3.

Before further explaining the operation of the sidelobe blanking system in accordance with the invention, the digital system of FIGS. 3A and 3B will be explained pointing out the variations from the system of FIGS. 2A and 2B. The channel 56 may include an in phase I channel 221 and a quadrature Q channel 223, the latter shown as a dotted box as it is similar to the I channel 221. A synchronous detector or phase detector 219 in the channel 221 is coupled to the lead 64 and receives a reference signal on a lead 213 from the local oscillator 46 to apply a binary signal representative of phase and amplitude to a lead 222. An A/D converter 220 responds to the detected signal on the lead 222 to serially apply a coded digital signal through a lead 224 to a digital pulse compressor 228. The transmitter 40 transmits a coded signal which may be any suitable compressor code such as a Barker Code, a pseudo random code, a Frank Code or a chirp code, for example. Binary phase codes and their operation are well-known in the art such as described in the book "Radar Signals" by Charles E. Cook and Marvin Bernfield, 1967, Academic Press. The digital pulse compressor 228 may be of any conventional type such as those using surface wave techniques or delay line techniques. The illustrated pulse compressor operable with a Barker code includes a pulse compression line 225 which may have a first register 227 containing the transmit code received on a lead 229 and a register 231 through which is shifted the received signal from the lead 224. A circuit 233 provides a bit by bit comparision and a counter 235 and a comparator 237 determines the number of agreements and disagreements between corresponding bits on a clock or range bin time basis. The counter 235 and the comparator 237 may include a converter for converting the agreements and disagreements respectively to a + and a − current which is applied through an analog gate to an adder. The accumulated sum is passed through an A/D converter to provide a digital number which after comparison in the comparator 237 is applied through a composite lead 239 to an I and Q combining circuit 241 to provide a signal representative of the amplitude on a composite lead 230. The combining circuit 241 may either combine as $\sqrt{I^2 + Q^2}$ or as $I + KQ$ which is well-known in the art is an approximation that multiplies K times the smaller of I or Q and sums this with the other. The comparator 237 provides a subtraction of the number of agreements from a fixed number to provide the amplitude on the composite lead 230, of the absolute value of the number of agreements (A) minus the number of agreements (D) as a binary number. Because the |A−D| increases as a function of signal to noise ratio, as may be seen by a curve 231 of FIG. 7, this expression represents the statistical amplitude of the received signal referenced to the transmitted code. For example if |A-D| were plotted as a function of the signal S, the curve for a large noise level would be flatter in FIG. 7 and for a small noise level could be more vertical than curve 231. As the signal becomes larger, the phase at each range bin will be the phase of the signal and not of the noise. The signal representative of the amplitude of the compressed pulse is applied on the composite lead 230 which includes a plurality of conductors, to the video blanking switch 70 which may include a plurality of "AND" gates and in turn through a composite lead 232 to display units 192 and processor 194, for example.

In the sidelobe channel 100 and I channel 243 and a Q channel 245 are provided, both of which have similar elements. In a manner similar to the channel 56, a synchronous detector or phase detector 114 applies serial signals of phase and amplitude through a lead 242 to an A/D converter 240. The converter 240 passes a digital signal through a lead 244 to a digital pulse compressor line 246 which may be similar to the pulse compressor 228 including a pulse compressor 247, a counter 249 and a comparator 251. The pulse compressor 247 including a transmit code register 255, a receive code register 257 and a comparison circuit 259. The composite lead 250 transfers a digital number data containing amplitude or phase and amplitude to an I and Q combining circuit 261, also receiving the signal from the Q channel 245. The combining circuit 251 applies a digital number to a sample switch 252 which may, for example, include a plurality of AND gates responsive to the signals on the lead 250 and on the lead 172 to apply at a coincident condition, a gating pulse on the lead 179 to the blanking gate generator 180. In response to a 1-bit pulse generated by the blanking gate generator 180 on a lead 182 the switch 184, for amplitude limited operation, passes the pulse to the video blanking switch 70. A clock 258 synchronized with the transmitter 40 may provide timing to all appropriate circuits such as the pulse compressor, as is well-known in the art and may have the clock pulse interval equal to the range bin interval. If in phase and quadrature channels are used as illustrated, to provide phase information, two channels (I and Q) are utilized at the inputs of the detectors 219 and 114 for each receiver channel 56 and 100, which I and Q channels are recombined at the outputs of the pulse compressors. The principles of the invention include operation with or without in phase and quadrature channels.

A digital comparator 260 responds to the digital signals on the leads 230 and 250 to detect a condition when the sidelobe signal is greater than the main lobe signal and to apply blanking signals to the switch 184. A digital threshold detector 262 responds to the digital signal on the lead 230 so that at conditions when the signal is below a predetermined digital threshold (so as to be within the system noise), a strobe signal is applied through a lead 270 to the switch 184 to pass a 1-bit comparison or blanking pulse from the comparator 260 on the lead 206 therethrough to the video blanking switch 70. In the normal condition, the switch 184 is in a condition to pass the 1-bit blanking pulse from the lead 182 to the lead 186.

Figure 4:
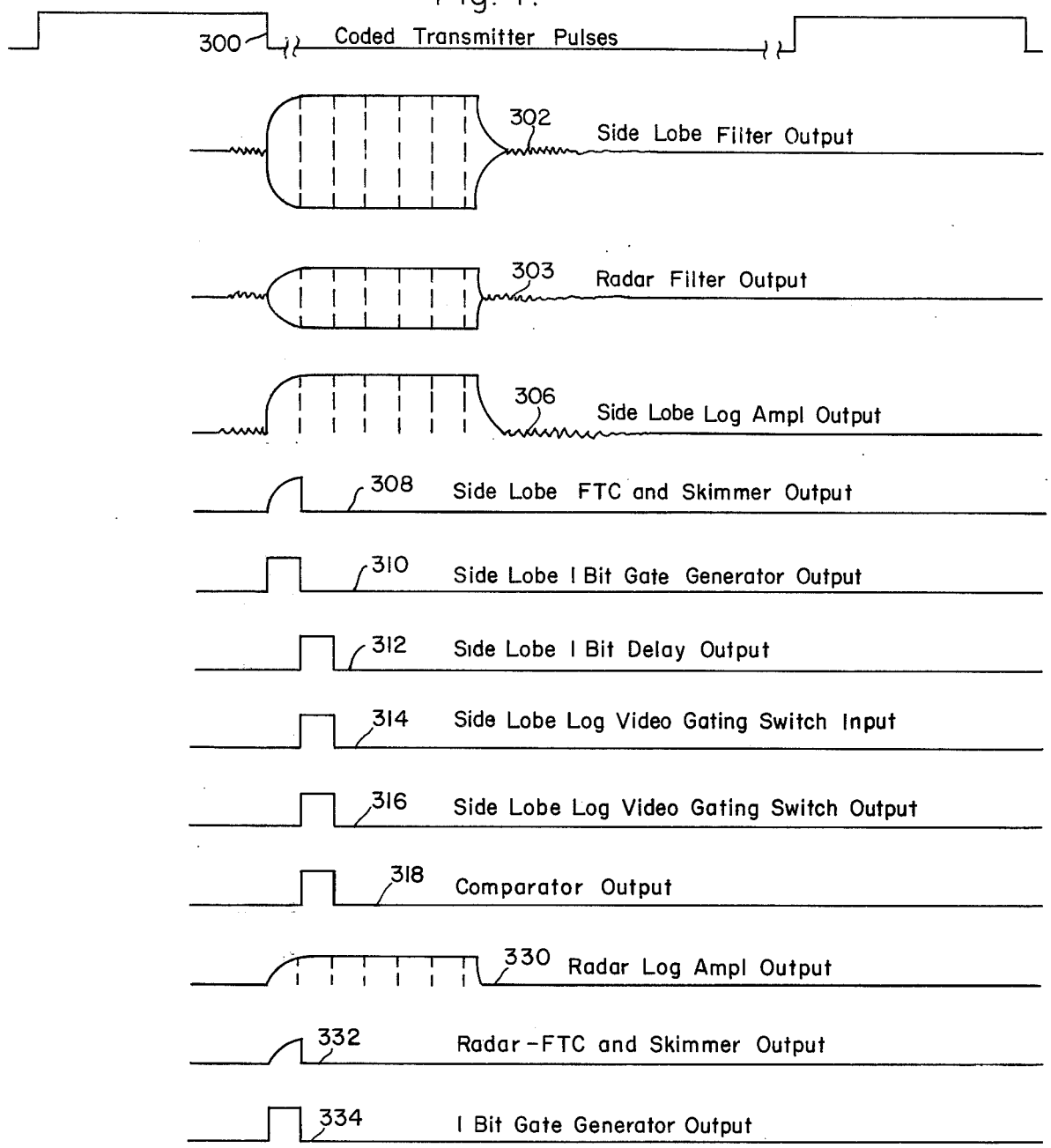

Referring now to the waveforms of FIGS. 4 and 5 as well as to FIGS. 2A and 2B and FIGS. 3A and 3B the operation of the sidelobe blanking system in accordance with the invention will be further explained, responding to a coded signal from the interfering source 12. A pulse of a waveform 300 shows the radar transmitted coded pulses having a prf as determined by the transmitter 40. In the sidelobe channel 100, the signal at the output of the filter 104 is shown by a waveform 302 which has digital periods as shown by dotted lines therein for indicating the coding intervals which may be clock intervals, for example. The signal of a waveform 303 is provided at the output of the filter 54 in the radar channel 56. The signal of the waveform 306 in the sidelobe channel appears at the lob amplifier 130 output on the lead 132. At the output of the skimmer 136, the signal of a waveform 308 is formed substantially at the leading edge of the pulse of the waveform 306. The 1-bit sample gate generator 142 develops the pulse of the waveform 310 which is applied through the 1-bit delay circuit 146 to develop pulse of a waveform 312 on a lead 148 which is applied to the log video gating switch 150. The gating switch 150 also receives the signal of a waveform 314 to pass the signal of a waveform 316 to the comparator 160 having an amplitude representative of the sidelobe amplitude. The output of the comparator 160 when the signal in the sidelobe channel is greater than the signal in the radar channel, as shown by a waveform 318 is then passed through the 2-bit gate generator 164 to provide a pulse of a waveform 319 which is applied to the delay circuit 170 to provide the signal of a waveform 320 which is applied to the sample switch 126.

Considering now the operation in the radar channel, the radar log amplifier output of a waveform 330 is provided on the lead 78 and the output of the skimmer 86 is shown by the waveform 332. The output of the 1-bit sample generator 90 is shown by waveform 334 and the one bit delay output is shown by the waveform 335. The log video gating switch input is shown by a waveform 336. The log video gating switch input on the lead 55 of a waveform 340 is applied from the lead 78 to the switch 82 and the output of the comparator 160 as shown by the waveform 318 indicates that the sidelobe amplitude is greater than the main lobe amplitude as indicated, or if the main lobe amplitude is greater than the sidelobe amplitude no pulse is provided as indicated by the dotted line 346. The output of the 2-bit gate generator 164 is shown by the waveform 319 and the output of the delay circuit 170 is shown by waveform 320. The time delay of the circuit 170 is the delay $\tau$ which is the time delay in either of the pulse compressors 122 and 66 minus 2 bits or clock periods. The value of $\tau$ may be determined for any compression system as is well-known in the art. A short delay is also provided in the circuit 170 so that the pulse of the waveform 320 is centered on the pulses at the output of the sidelobe compressor. In response to the pulse of the waveform 320 and the occurrence of a sidelobe compressed pulse of a waveform 368, that pulse is passed through the blanking switch 126 as the waveform 368 to provide a waveform 369 on the lead 179 and generate a gate of a waveform 380 on the lead 182. This operation of the sample switch 126 assures that blanking occurs only when a sidelobe signal has an identical code so as to pass through the pulse compressor 122 of FIGS. 2A and 2B or the digital pulse compressor 246 of FIGS. 3A and 3B. The radar pulse compressor output of a waveform 382 shows this sidelobe return in the radar channel and a target return 383 from a tracked target. The output of the blanking switch 70 on the lead 190 is shown by waveform 386 with the sidelobe return blanked out. The target signal of the waveform 386 which occurs at a different time than the sidelobe energy is passed through the blanking switch 70. It is to be noted that when both a target return and the interference returns are coincident in time the interference source may transmit energy of a sufficient amplitude to blank out the target and the interference signals. The above operation described relative to the analog system of FIGS. 2A and 2B is similar for the digital system of FIGS. 3A and 3B and need not be further explained.

The above-described operation utilizing the comparator 160 occurs when the signal has an amplitude greater than the limiting threshold. When the amplitude is limited, the comparators 198 or 260 operate to generate a blanking gate similar to the pulse of the waveform 380 when the sidelobe signal is larger than the main lobe or radar signal to control the blanking switch 70 and the gate pulse generated by the blanking gate generator 180 are not passed through the switch 184. The operation for the unlimited mode condition is similar to the limited mode except for this generation of the blanking gate and will not be explained in further detail.

Figure 6:
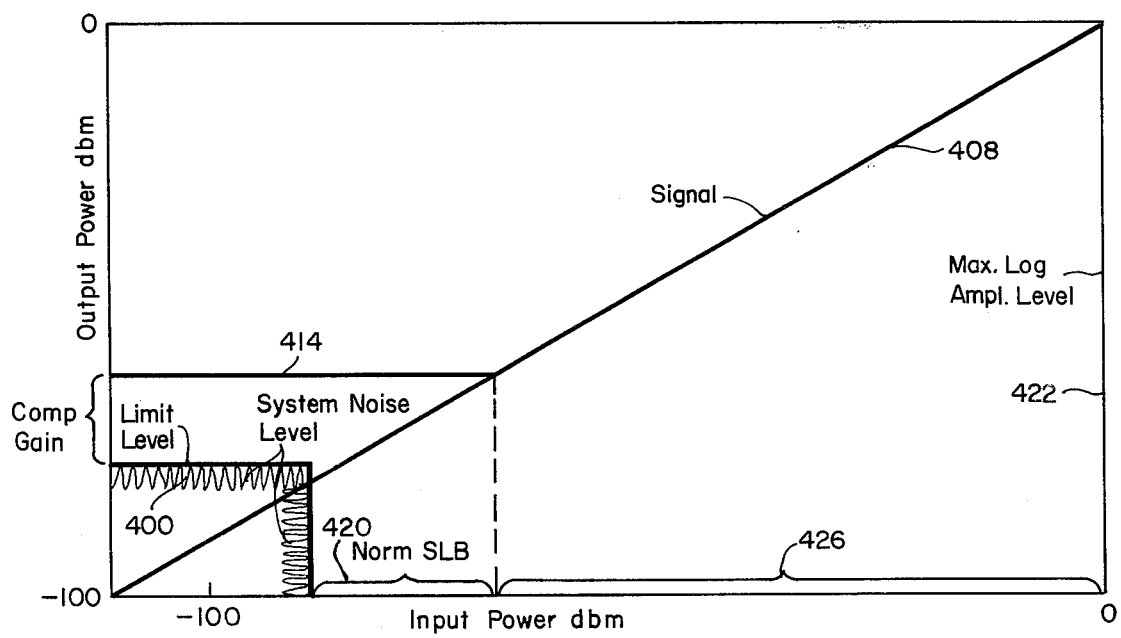
FIG. 6 is a schematic graph of output power versus input power for further explaining the dynamic ranges of operation of the systems of FIGS. 2A and 2B and FIGS. 3A and 3B.

Referring now to FIG. 6 which shows a signal curve 408 as a function of output versus input power in decibels below a milliwatt (dbm), the two dynamic ranges of operation will be further explained. The output scale of FIG. 6 is shown with zero system gain for convenience of illustration. The system noise level is shown by a waveform 410 and a limit level 412 shows the level of the threshold set by the amplitude limiters 60 and 110, in which condition the signal is indistinguishable from the noise. A line 414 shows the upper limit of the compression gain which establishes a range 420 for the normal compressed pulse or unlimited sidelobe blanking operation because the signal amplitude is determined by the noise amplitude. A line 422 which is the maximum power or gain position of the log amplifiers 76 and 130, establishes the upper limit of a range 426 for the limited or improved sidelobe blanking operation.

Thus, there has been provided a sidelobe blanking system that utilizes a sampling technique for determination of the larger signal. The concepts of the system are especially applicable to radar systems utilizing pulse compression in which the dynamic range is limited because of threshold limiting so as to eliminate undesired signals, for example. By sampling prior to the threshold circuit a large dynamic range of the receiver is processed by providing a detecting and switching arrangement, the system provides reliable operation over the full dynamic range of the receiver.

What is claimed is:
1. A sidelobe blanking system operable in a radar system receiving a coded pulse having a radar channel and a sidelobe channel each with amplitude limiting means and pulse compression means comprising:
   first and second sampling means for sampling the coded pulse prior to said amplitude limiting means respectively in said radar channel and said sidelobe channel;
   comparator means coupled to said first and second sampling means for generating a signal when the amplitude of the sampled signal in said sidelobe channel is larger than in said radar channel;
   switching means responsive to the compression means in said sidelobe channel and the signal generated in said comparator means to develop a gating pulse; and
   blanking means coupled to the compression means in said radar channel and responsive to said gating pulse to blank out the signal in said radar channel.

2. The system of claim 1 in which delay means is included in said first and second sampling means for sampling the coded signals in the sidelobe and radar channels after the leading edges thereof have occurred.

3. The system of claim 2 in which delay means is included in said comparator means to delay the signal generated therein a period equal to the pulse compression period.

4. The combination of claim 3 further including control means responsive to the limited signal in said radar channel to detect the signal at an amplitude below a threshold selected as a function of the limiting of said amplitude limiting means and a comparator responsive to the outputs of said radar channel and said sidelobe channel and coupled to said blanking means to respond to the detected signal below said threshold to control said blanking means and to inhibit said gating pulse from passing to said blanking means.

5. A sidelobe blanking system operable in a radar system having first and second receiver channels for receiving signals including coded signals and interference signals, each channel having a pulse compressor and an amplitude limiter responsive to the received signals and a pulse, comprising:
   first and second differentiating means respectively coupled to the first and second channels to receive the received signals before passing through the corresponding amplitude limiters;
   first and second delay means respectively coupled to said first and second differentiating means;
   first and second gating means respectively coupled to the first and second channels to receive the received signals before passing through the corresponding amplitude limiters and coupled to said first and second delay means;
   comparator means coupled to said first and second gating means;
   sample switching means coupled to the pulse compressor in said first channel and to said comparator means for passing signals therethrough; and
   blanking switch means coupled to the pulse compressor in said second channel and to said sample switching means for blanking out signals from the compressor in said second channel in response to said sample switching means.

6. The combination of claim 5 in which blanking gate generator means are coupled between said sample switching means and said blanking switch means.

7. The combination of claim 6 in which delay means are coupled between said comparator means and said sample switching means to include a delay to compensate for the pulse compressor delay.

8. The combination of claim 7 further including compressed pulse comparator means coupled to the outputs of the pulse compressors of said first and second channels for detecting the amplitude of the signal in said first channel being larger than the amplitude of the signal in said second channel;
   mode switching means coupled between said blanking gate generator means and said blanking switch means and coupled to said compressed pulse comparator means; and
   detecting means coupled between the output of the pulse compressor in said second channel and said mode switching means to control said mode switching means to pass a blanking signal to said blanking switch means for said blanking gate generator means when the signal in said second channel exceeds a predetermined level and to pass a signal from said compressed pulse comparator to said blanking switch means when the signal in said second channel is less than said predetermined level.

9. The combination of claim 8 in which said predetermined threshold is a function of the amplitude limiter.

10. A radar sidelobe blanking system for a radar system having a radar channel and a sidelobe channel each including amplitude limiting means and pulse compressor means comprising:

first comparison means for comparing the amplitude of the received signal before amplitude limiting in the radar channel and the sidelobe channel;

second comparison means for comparing the amplitude of the received signal at the outputs of the pulse compressor means in the radar channel and the sidelobe channel;

blanking means coupled to the output of said radar channel, and detecting means responsive to the signal in said radar channel and coupled to said first and second comparison means for connecting one or the other to said blanking means for blanking out the signal in said radar channel as a respective function of the signal in said radar channel being limited or not limited.

* * * * *